United States Patent
Ogose et al.

(10) Patent No.: US 10,182,563 B2
(45) Date of Patent: Jan. 22, 2019

(54) SPOOL FOR DUAL-BEARING REEL (71) Applicant: Shimano Inc., Sakai, Osaka (JP)

(72) Inventors: Hiroki Ogose, Sakai (JP); Akira Niitsuma, Sakai (JP); Ken'ichi Kawasaki, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 183 days.

(21) Appl. No.: 15/375,326

(22) Filed: Dec. 12, 2016

(65) Prior Publication Data

US 2017/0202193 A1 Jul. 20, 2017

(30) Foreign Application Priority Data

Jan. 19, 2016 (JP) .................................. 2016-008321

(51) Int. Cl.
*A01K 89/01* (2006.01)
*A01K 89/015* (2006.01)

(52) U.S. Cl.
CPC .............................. *A01K 89/01931* (2015.05)

(58) Field of Classification Search
CPC ............................................... A01K 89/01931
See application file for complete search history.

(56) References Cited

U.S. PATENT DOCUMENTS

| | | | | |
|---|---|---|---|---|
| 2,775,418 A * | 12/1956 | Cadman | ................. | A01K 89/00 242/118.7 |
| 4,720,056 A * | 1/1988 | Danielsson | .......... | A01K 89/016 242/303 |
| 5,199,682 A * | 4/1993 | James | ................. | A01K 89/016 242/295 |
| 5,407,144 A * | 4/1995 | Ryall | ................... | A01K 89/056 242/295 |
| 5,655,722 A * | 8/1997 | Muckridge | .......... | A01K 89/058 242/295 |
| 5,915,639 A * | 6/1999 | Farris | ..................... | A01K 87/06 242/295 |
| 6,164,578 A * | 12/2000 | Tsutsumi | ........... | A01K 89/0111 242/322 |
| 2002/0027176 A1* | 3/2002 | Ikuta | ................. | A01K 89/0179 242/247 |

(Continued)

FOREIGN PATENT DOCUMENTS

| | | | | |
|---|---|---|---|---|
| JP | H10-165057 A | | 6/1998 | |
| JP | 2008005719 | * | 1/2008 | ............ A01K 89/01 |

*Primary Examiner* — Emmanuel M Marcelo
(74) *Attorney, Agent, or Firm* — United IP Counselors, LLC (57) ABSTRACT

A spool for a dual-bearing reel includes a bobbin trunk having a tubular shape, a pair of flanges and a plurality of first through holes. Each flange is provided on opposite ends of the bobbin trunk, each flange having a circular shape and a larger diameter than the bobbin trunk. The first through holes are provided in at least one flange of the pair of flanges and are circumferentially disposed at intervals about the at least one flange. The first through holes open in a radial position located at a distance away from an outer peripheral surface of the bobbin trunk, the distance being less than or equal to a second distance from the outer peripheral surface of the bobbin trunk, the second distance being 60% of a distance from the outer peripheral surface of the bobbin trunk to an outer peripheral surface of the at least one flange.

14 Claims, 12 Drawing Sheets

(56) References Cited

U.S. PATENT DOCUMENTS

| | | | |
|---|---|---|---|
| 2004/0169100 A1* | 9/2004 | Furomoto | A01K 89/0108 242/223 |
| 2005/0001085 A1* | 1/2005 | Kimura | A01K 89/00 242/227 |
| 2009/0179100 A1* | 7/2009 | Crofoot | A01K 89/016 242/292 |
| 2010/0181406 A1* | 7/2010 | Kang | A01K 89/016 242/267 |
| 2012/0055070 A1* | 3/2012 | Maerz | A01K 89/016 43/22 |
| 2014/0054403 A1* | 2/2014 | Maerz | A01K 89/016 242/231 |
| 2015/0014460 A1* | 1/2015 | Hyun | A01K 89/0155 242/289 |
| 2017/0347636 A1* | 12/2017 | Kitajima | A01K 89/0187 |
| 2018/0132465 A1* | 5/2018 | Hyun | A01K 89/046 |

* cited by examiner

SPOOL FOR DUAL-BEARING REEL

CROSS-REFERENCE TO RELATED APPLICATIONS

This application claims priority to Japanese Patent Application No. 2016-008321 filed on Jan. 19, 2016, the entirety of which is hereby incorporated by reference in its entirety.

BACKGROUND

Technical Field

The present disclosure relates to a spool, and particularly to a spool for a dual-bearing reel.

Background Information

A type of spool for a dual-bearing reel, which includes a pair of flanges each provided with a plurality of through holes circumferentially disposed at intervals has been known (see Japan Laid-open Patent Application Publication No. H10-165057). With the through holes provided in the flanges, the spool can be reduced in mass and inertia without reducing its outer diameter.

When rotated at a high speed in a fishing line releasing direction during a casting, the aforementioned well-known spool possibly produces noise (e.g., wind noise) due to passage of air through the through holes.

BRIEF SUMMARY

It is an object of the present disclosure to inhibit production of noise during a high speed rotation of a spool designed to achieve a reduction in a mass and an inertia.

A spool for a dual-bearing reel according to an aspect of the present disclosure includes a bobbin trunk having a tubular shape, a pair of flanges, each of which has a circular shape, and a plurality of first through holes. The pair of flanges is provided on both ends of the bobbin trunk. Each flange of the pair of flanges has a larger diameter than the bobbin trunk. The plurality of first through holes are provided in at least one flange of the pair of flanges. The plurality of first through holes are circumferentially disposed at intervals. The plurality of first through holes open in a radial position located at a distance away from an outer peripheral surface of the bobbin trunk. The distance is less than or equal to a second distance from the outer peripheral surface of the bobbin trunk. The second distance is 60% of a distance from the outer peripheral surface of the bobbin trunk to an outer peripheral surface of the at least one flange of the pair of flanges.

In the spool for a dual-bearing reel, the plurality of first through holes are disposed to open in a radial position away from the outer peripheral surface of the bobbin trunk at a distance corresponding to 60% or less of a difference in a length between the outer diameter of the bobbin trunk and that of the flange relevant to the first through holes. With this construction, the first through holes are covered with the fishing line and are not exposed to the outside in an initial phase of casting in which the speed of casting is the fastest. Therefore, air is prevented from passing through the first through holes, and an occurrence of a noise can be inhibited even when the spool is rotated at a high speed during a casting.

Each of the plurality of first through holes can be a circular hole having a center located closer to the outer peripheral surface of the bobbin trunk than the radial position. According to this construction, the first through holes can be easily formed by machining or molding.

Each of the plurality of first through holes can be a rectangular hole elongated in a radial direction with rounded ends. According to this construction, each through hole can be reduced in width along a rotational direction of the spool by the elongated rectangular holes with rounded ends even when each elongated rectangular hole with rounded ends is bored by the same amount as a circular hole. Therefore, the amount of air passing through the through holes can be reduced, and an occurrence of a noise (i.e., wind sound) can be further inhibited.

Each flange of the pair of flanges can be constructed to have a thickness gradually increasing in a radial direction from outside to inside. According to this construction, a bobbin trunk-side part of each flange has a gradually increasing thickness. Hence, even when the first through holes are provided in close positions to the bobbin trunk, degradation in strength of the flange relevant to the first through holes can be inhibited.

Each of the plurality of first through holes can be provided with a chamfered part on at least a part of a circumferential edge of the first through holes. The at least a part of the circumferential edge is located close to the outer peripheral surface of the bobbin trunk. According to this construction, the flow rate of air becomes unlikely to vary due to the chamfered parts, and an occurrence of a noise can be further inhibited.

The spool can further include a second through hole penetrating through the outer peripheral surface and an inner peripheral surface of the bobbin trunk. According to this construction, it is possible to achieve a further reduction in a weight and in an inertia of the spool.

A spool for a dual-bearing reel according to another aspect of the present disclosure includes a bobbin trunk having a tubular shape, a pair of flanges, each of which has a circular shape, and a plurality of first through holes. The pair of flanges is provided on both ends of the bobbin trunk. Each flange of the pair of flanges has a larger diameter than the bobbin trunk. The plurality of first through holes are provided in at least one flange of the pair of flanges. The plurality of first through holes are circumferentially disposed at intervals such that the plurality of first through holes are covered with a fishing line when a wound length of the fishing line is half a maximum wound length thereof.

In the spool for a dual-bearing reel, the plurality of first through holes are provided in at least one flange of the pair of flanges. The plurality of first through holes are circumferentially disposed at intervals such that the plurality of first through holes are covered with the fishing line when the wound length of the fishing line is half the maximum wound length thereof. The length of the fishing line maximally released in a normal casting is approximately half the maximum wound length of the fishing line. Therefore, the first through holes are not exposed during a casting. In other words, the first through holes are covered with the fishing line and are not exposed to the outside during a casting. Therefore, an occurrence of a noise can be inhibited even when the spool is rotated at a high speed during a casting.

Overall, according to the present disclosure, production of noise can be inhibited during a high speed rotation of a spool designed to achieve a reduction in a mass and an inertia.

BRIEF DESCRIPTION OF THE DRAWINGS

Referring now to the attached drawings which form a part of this original disclosure.

DETAILED DESCRIPTION OF EMBODIMENTS

<Entire Construction of Dual-Bearing Reel>

Figure 1:
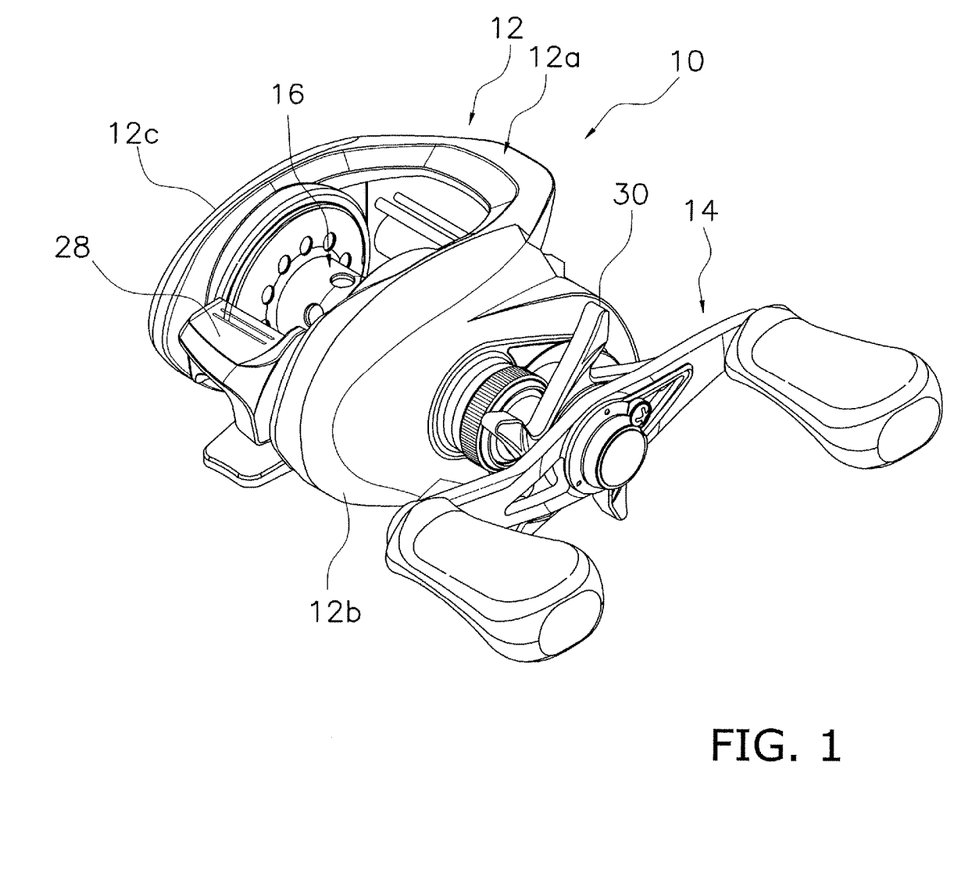
FIG. 1 is a perspective view of a dual-bearing reel employing a spool according to a preferred embodiment of the present disclosure.
Figure 2:
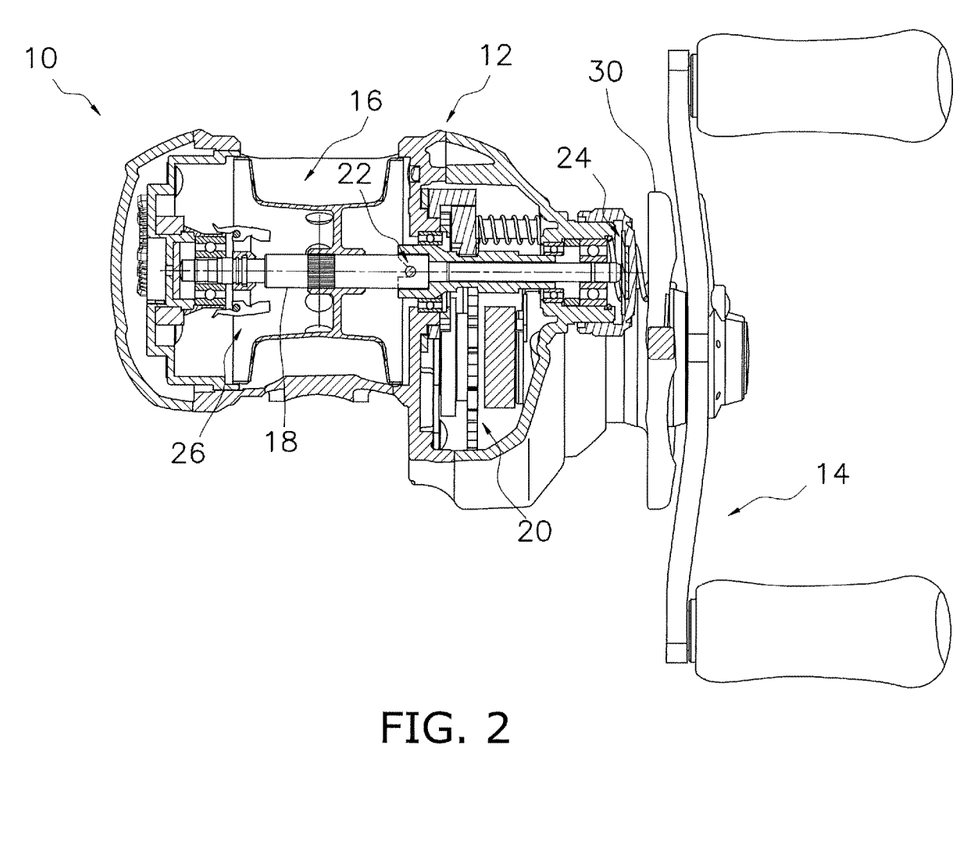
FIG. 2 is a cross-sectional view of the dual-bearing reel.

In FIGS. 1 and 2, a dual-bearing reel 10 is a type of reel that forwardly releases a fishing line, and employs a spool 16 according to a preferred embodiment of the present disclosure. The dual-bearing reel 10 includes a reel unit 12, a handle 14, the spool 16 which is rotated in a fishing line winding direction by the handle 14, and a spool shaft 18 (see FIG. 2). The handle 14 is rotatably mounted to a lateral part of the reel unit 12.

As shown in FIG. 1, the reel unit 12 includes a frame 12a, a first side cover 12b and a second side cover 12c. The first and second side covers 12b and 12c cover both lateral sides of the frame 12a. The reel unit 12 supports any one of the spool shaft 18 and the spool 16 such that the supported one is rotatable. In the present preferred embodiment, the reel unit 12 supports the spool shaft 18 such that the spool shaft 18 is rotatable.

A rotation transmission mechanism 20, a clutch mechanism 22, a drag mechanism (not shown in the drawings), a casting control mechanism 24 and a spool brake mechanism 26 are mounted to the interior of the reel unit 12. The rotation transmission mechanism 20 transmits a rotation of the handle 14 to the spool 16. The clutch mechanism 22 is mounted to an intermediate position in a rotation transmission path of the rotation transmission mechanism 20. The clutch mechanism 22 is switchable between a transmission allowed state and a transmission blocked state. When switched into the transmission allowed state, the clutch mechanism 22 allows a transmission of a rotation of the handle 14 to the spool 16. When switched into the transmission blocked state, the clutch mechanism 22 blocks a transmission of a rotation of the handle 14 to the spool 16. Also in the transmission blocked state, the spool 16 is made freely rotatable. The clutch mechanism 22 is settable in either the transmission allowed state or the transmission blocked state by operating a clutch operating member 28 mounted to the reel unit 12. In the present preferred embodiment, the clutch operating member 28 is mounted behind the spool 16 and is movable up and down. The drag mechanism is mounted to another intermediate position in the rotation transmission path in order to adjust a tension (drag force) acting on the fishing line. The drag force of the drag mechanism is adjustable by operating a drag operating member 30 disposed in axial alignment with the handle 14. The casting control mechanism 24 can constantly brake the spool 16 by pressing both ends of the spool shaft 18. The spool brake mechanism 26 brakes a fishing-line releasing directional rotation of the spool 16 during a casting. The spool brake mechanism 26 can brake the spool 16 by a centrifugal force, a magnetic force or a regenerative braking. In the present preferred embodiment, the spool brake mechanism 26 brakes the spool 16 by a centrifugal force.

<Constructions of Spool and Spool Shaft>

Figure 3:
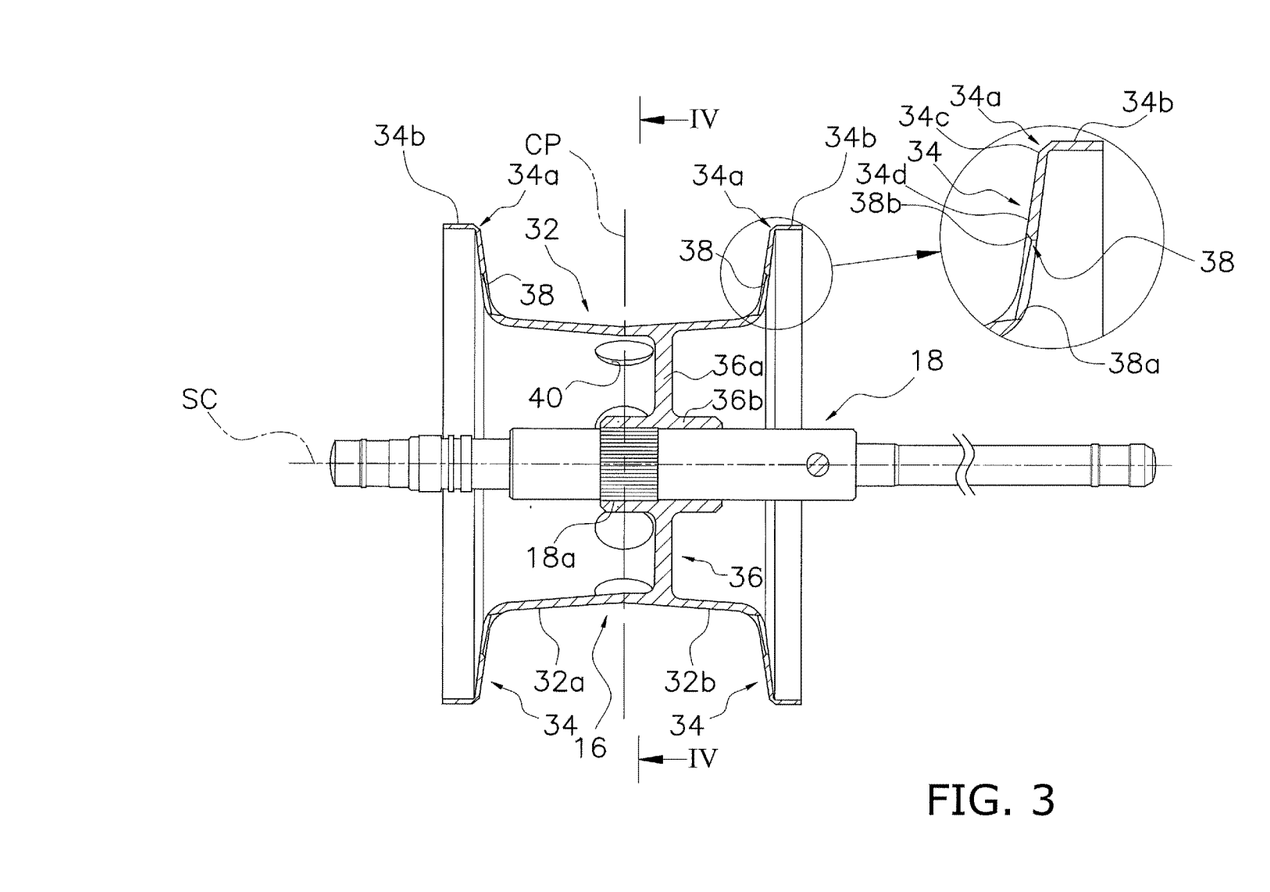
FIG. 3 is a cross-sectional view of the spool to which a spool shaft is attached.
Figure 4:
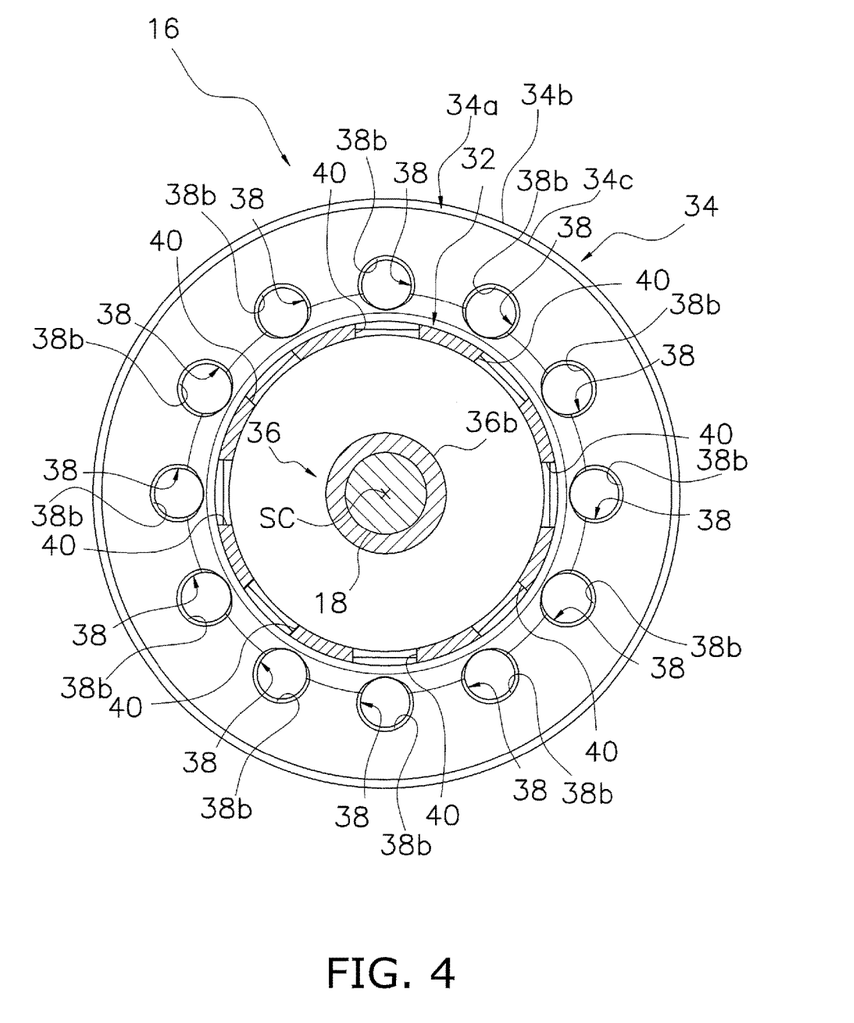
FIG. 4 is a cross-sectional view of the spool taken along cutaway line IV-IV in FIG. 3.

As shown in FIGS. 3 and 4, the spool 16 is coupled to the spool shaft 18 and is unitarily rotatable with the spool shaft. The spool 16 includes a bobbin trunk 32 having a tubular shape, a pair of flanges 34, each flange 34 provided on opposite ends of the bobbin trunk 32, a coupling part 36 provided on the inner peripheral surface of the bobbin trunk 32, a plurality of first through holes 38 and a plurality of second through holes 40.

The bobbin trunk 32 winds the fishing line onto its outer peripheral surface. In the present preferred embodiment, the bobbin trunk 32 includes a first taper surface 32a and a second taper surface 32b. The first and second taper surfaces 32a and 32b slightly tilt from both ends of the bobbin trunk 32 such that a distance from an axis SC of the spool shaft 18 is minimized at a center position CP in the axial direction. In the present preferred embodiment, the outer peripheral surface of the bobbin trunk 32 refers to the outer peripheral surface at the center position CP.

Each flange 34 of the pair of flanges 34 is constructed to gradually increase in thickness in a radial direction from the outside to the inside. The pair of flanges 34 is shaped to be line-symmetric to each other with respect to the center position P in the axial direction of the spool 16. Each flange 34 of the pair of flanges 34 includes a third taper surface 34a and a tubular part 34b. The third taper surface 34a functions as an indication of a fishing-line maximally wound position. The tubular part 34b is provided on the outer peripheral side of the third taper surface 34a in order to prevent the fishing line from getting stuck. The third taper surface 34a is a taper surface that tilts to reduce in diameter toward the center position CP in the axial direction. As shown in a close-up diagram of FIG. 3, an annular inner peripheral side edge 34c of the third taper surface 34a functions as the indication of the fishing-line maximally wound position. The outer peripheral surface of each flange 34 corresponds to that of the tubular part 34b.

The coupling part 36 includes a disc part 36a and a tubular mount part 36c. The disc part 36a is integrally provided on the inner peripheral surface of the bobbin trunk 32. The tubular mount part 36b is integrally provided on the inner peripheral part of the disc part 36a. The tubular mount part 36b is coupled to the spool shaft 18 in a unitarily rotatable state by, for instance, press-fitting a serration part 18a provided on the outer peripheral surface of the spool shaft 18 to the tubular mount part 36b.

Figure 5:
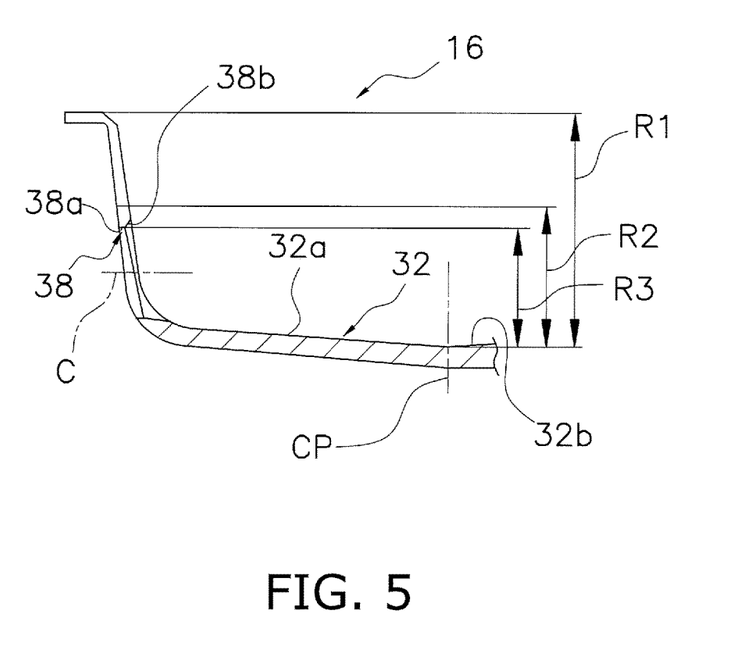
FIG. 5 is an enlarged cross-sectional view of a flange of the spool.

In the present preferred embodiment, as shown in FIG. 5, each of the plural first through holes 38 opens radially inward from a radial position located away from the outer peripheral surface of the bobbin trunk 32 at a third distance R3. The third distance R3 is less than or equal to a second distance R2 from the outer peripheral surface of the bobbin trunk 32. The second distance R2 is 60% of a first distance R1 from the outer peripheral surface of the bobbin trunk 32 to that of each flange 34. The plural first through holes 38 are provided in each flange 34 and are circumferentially disposed at intervals. The number of the plural first through holes 38 is, for instance, 12. However, the number of the plural first through holes 38 is not limited to 12. The plural first through holes 38 are disposed in consideration of rotational balance and strength. For example, the number of the first through holes 38 is preferably any of the numbers 6 to 20. When the number of the first through holes 38 is less than or equal to 5, an increase in a diameter of each first through hole 38 might be inevitable to achieve a reduction in a weight and in an inertia of the spool 16. On the other hand, when the number of the first through holes 38 is greater than or equal to 21, an increase in a cost of processing the first through holes 38 and a degradation in a strength of each flange 34 might be inevitable. Thus, the first through holes 38 are an example of a lightening means. Each first through hole 38 is a circular hole having a center C located closer to the outer peripheral surface of the bobbin trunk 32 than the radial position at the third distance R3. As shown in the close-up diagram of FIG. 3, each first through hole 38 includes a hole part 38a and a chamfered part 38b. The hole part 38a has a circular shape. The chamfered part 38b is provided on at least a part of a circumferential edge of each hole part 38a on an inner lateral surface 34d of each flange 34, i.e., a part located on a close side to the outer peripheral surface of the bobbin trunk 32. It should be noted that the opening position of each first through hole 38 is defined based on not the chamfered part 38b but on the hole part 38a. Additionally, in the present preferred embodiment, the chamfered part 38b is made in the shape of a taper surface, and is provided on the entire circumferential edge of each hole part 38a.

As shown in FIG. 4, the plural second through holes 40 penetrate through the outer peripheral surface and the inner peripheral surface of the bobbin trunk 32. In the present preferred embodiment, as shown in FIG. 3, each second through hole 40 is made in the shape of a circle formed about a center located on the center position CP in the axial direction. Each second through hole 40 is provided with a chamfered part (not shown in the drawings) axially extending in an elliptical shape on its edge.

In the spool 16 as described above, when the fishing line wound up to the outer peripheral parts of the flanges 34 is released during a casting, the first through holes 38 are covered with the fishing line and are not exposed until approximately half the entire length of the fishing line is released. Therefore, air does not pass the first through holes 38 in a high speed rotation of the spool 16 in the initial phase of a casting. Therefore, an occurrence of a noise attributed to an air stream can be inhibited during a casting.

<First to Third Modifications>

It should be noted that in the following explanation, a constituent element, having the same construction as its relevant constituent element in the aforementioned preferred embodiment, will not be explained and are denoted by a reference sign assigned to the relevant constituent element. On the other hand, a constituent element, having a different construction from its relevant constituent element in the aforementioned preferred embodiment, will be denoted by a three-digit reference sign, the last two digits of which correspond to a reference sign assigned to the relevant constituent element.

Figure 6:
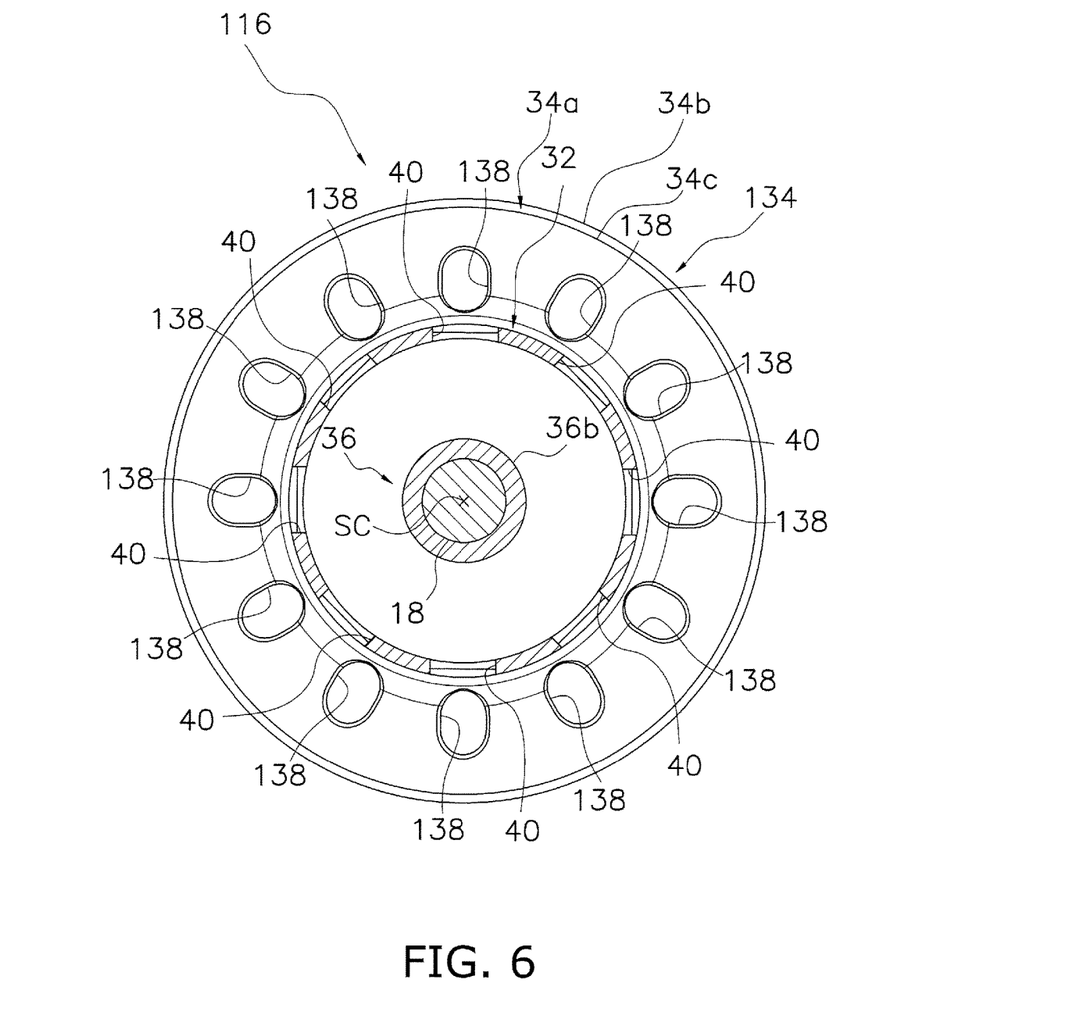
FIG. 6 is a cross-sectional view of a spool according to a first modification and corresponds to FIG. 4.
Figure 7:
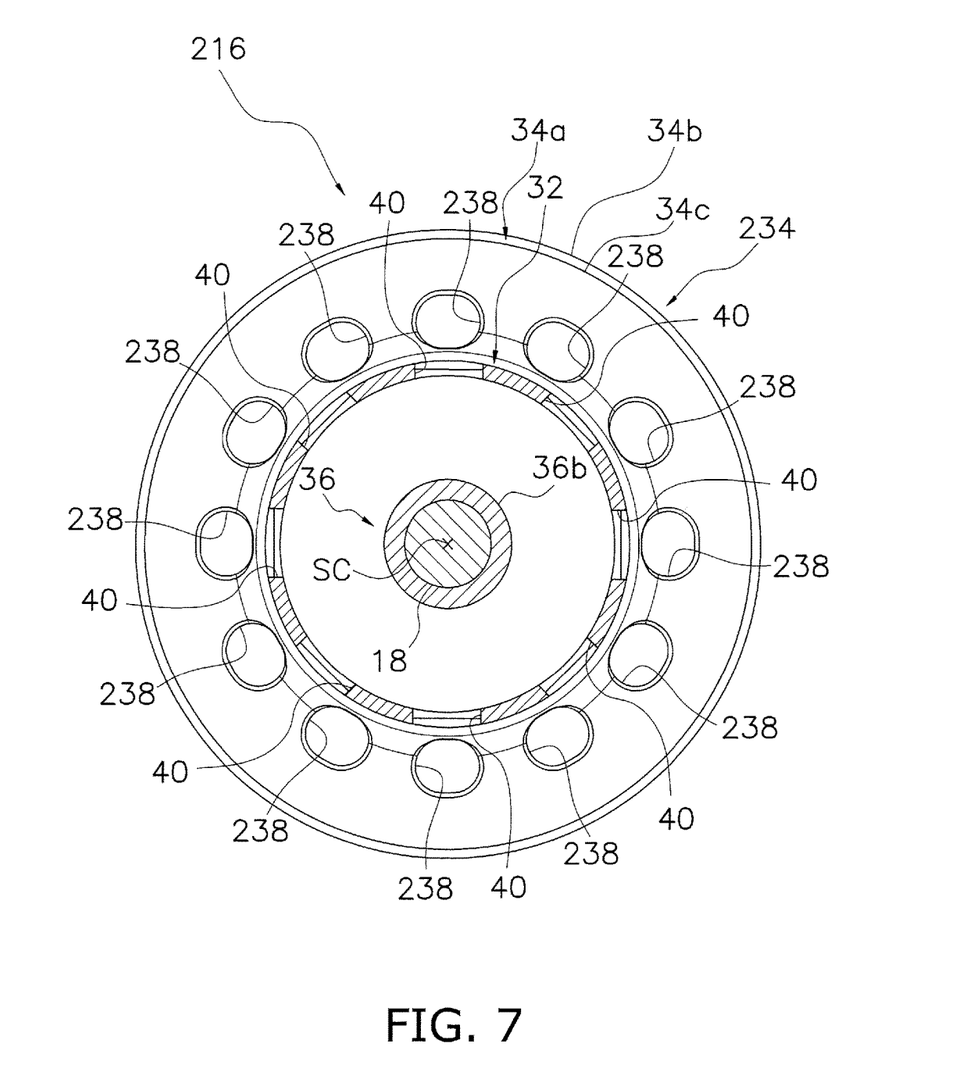
FIG. 7 is a cross-sectional view of a spool according to a second modification and corresponds to FIG. 4.
Figure 8:
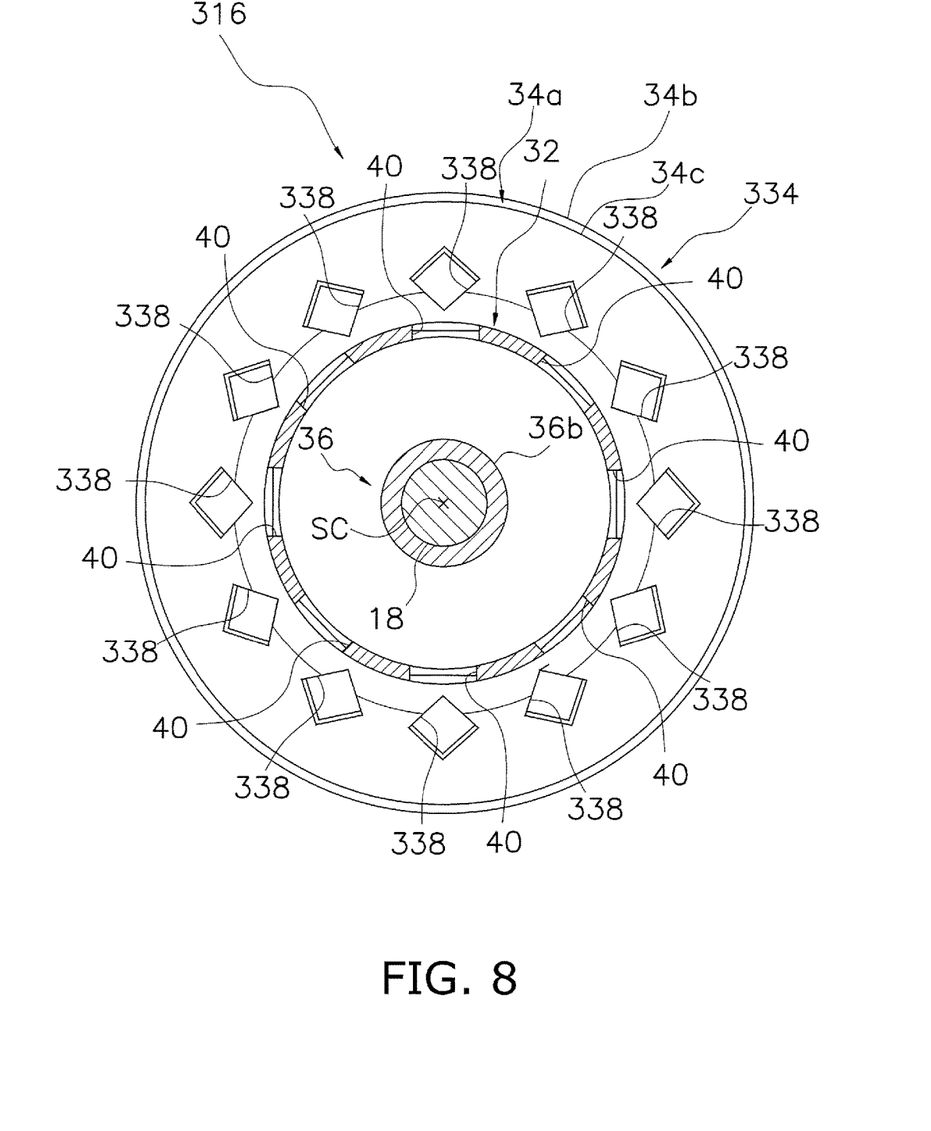
FIG. 8 is a cross-sectional view of a spool according to a third modification and corresponds to FIG. 4.
Figure 9:
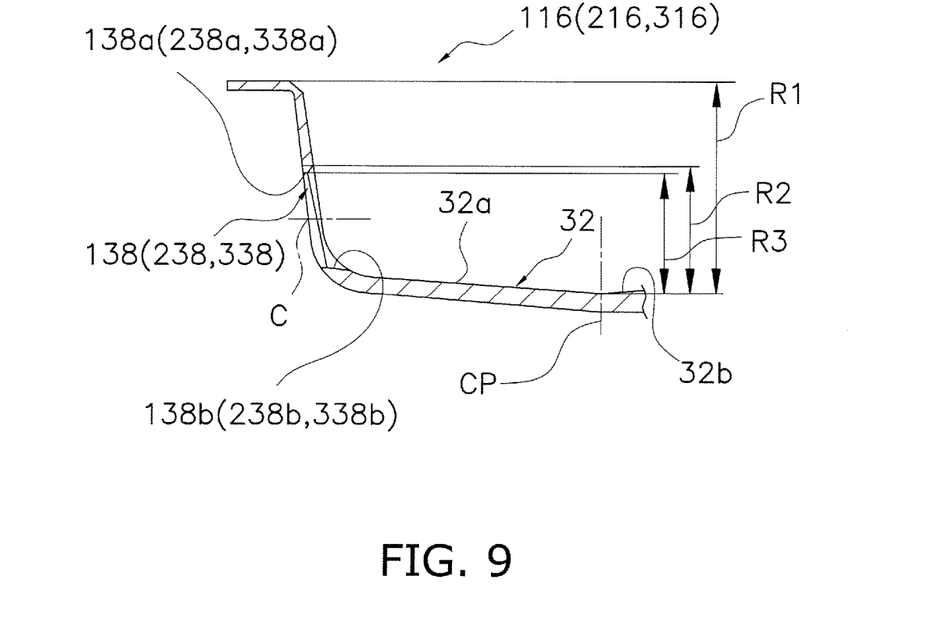
FIG. 9 is an enlarged cross-sectional view of a flange of the spool according to each of the first to third modifications and corresponds to FIG. 5.

In the aforementioned preferred embodiment, the hole part 38a of each first through hole 38 is made in the shape of a circle. However, the shape of the hole part 38a of each first through hole 38 is not limited to a circle. For example, in a first modification shown in FIG. 6, a hole part 138a of each first through hole 138 of a spool 116 is made in the shape of a rectangular hole elongated in a radial direction from the axis of the spool shaft SC with rounded ends (or an oval hole elongated in a radial direction from the axis of the spool shaft SC). Additionally, in a second modification shown in FIG. 7, a hole part 238a of each first through hole 238 of a spool 216 is made in the shape of a rectangular hole elongated in a circumferential direction about the axis of the spool shaft SC with rounded ends (or a circumferentially elongated oval hole). Moreover, in a third modification shown in FIG. 8, a hole part 338a of each through hole 338 of a spool 316 is made not in the shape of a circular hole but in the shape of a polygonal hole. Thus, the first through holes 138, the first through holes 238, and the first through holes 338 are other examples of a lightening means. Similarly, in the first to third modifications, as shown in FIG. 9, for instance, each first through hole 138 (238 or 338) is disposed to open radially inward from a radial position located away from the outer peripheral surface of the bobbin trunk 32 at the third distance R3. The third distance R3 is less than or equal to the second distance R2. The second distance R2 is 60% of the first distance R1 from the outer peripheral surface of the bobbin trunk 32 to the outer peripheral surface of each flange 34. Additionally, similarly to the aforementioned preferred embodiment, a chamfered part 138b (238b or 338b) is made in the shape of a taper surface, for instance, and is provided on the entire circumferential edge of each hole part 138a (238a, 338a). Thus, the chamfered parts 138b, 238b, and 338b are examples of a noise reducing means.

<Fourth Modification>

Figure 10:
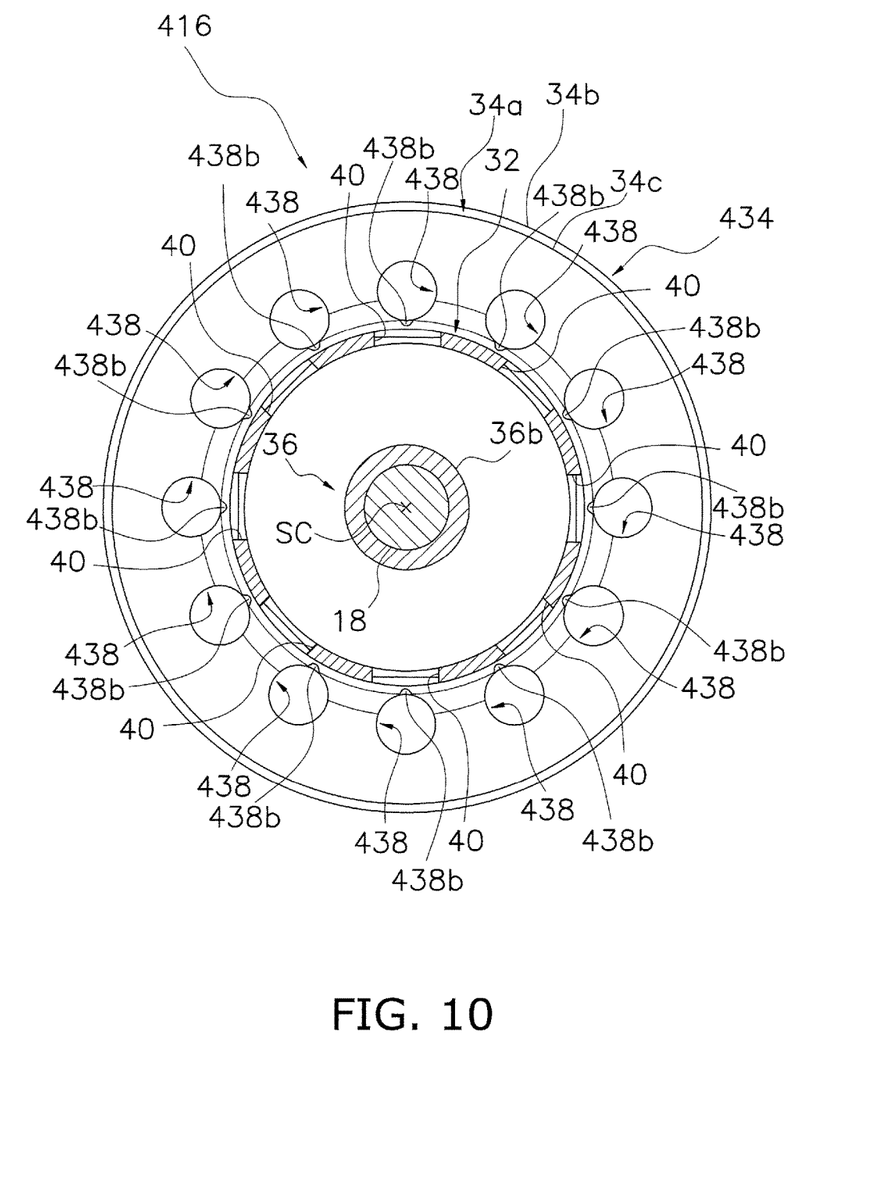
FIG. 10 is a cross-sectional view of a spool according to a fourth modification and corresponds to FIG. 4.
Figure 11:
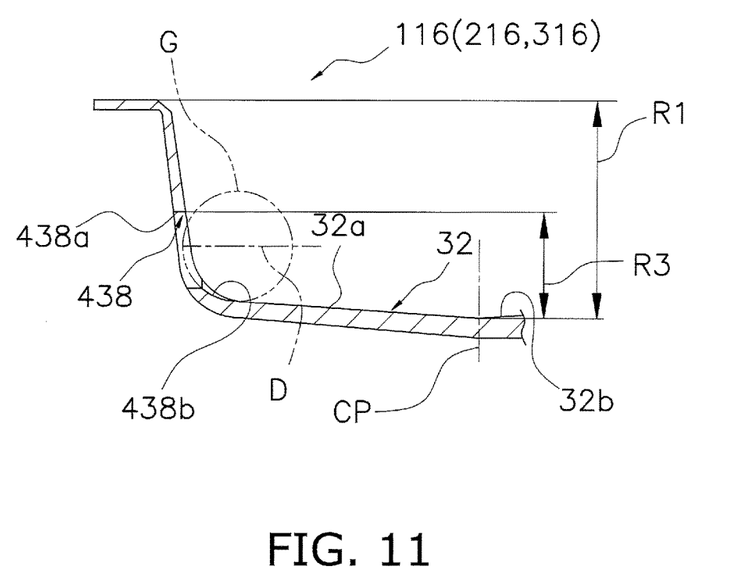
FIG. 11 is an enlarged cross-sectional view of a flange of the spool according to the fourth modification and corresponds to FIG. 5.

In a fourth modification shown in FIGS. 10 and 11, a hole part 438a of each first through hole 438 is made in the shape of a circle and a chamfered part 438b is provided on a part of the circumferential edge of each hole part 438a, i.e., a part located on a close side to the outer peripheral surface of the bobbin trunk 32. Thus, the first through holes 438 are another example of a lightening means. For example, the chamfered part 438b is formed in a spherical shape by machining only the part of each hole part 438a located closest to the outer peripheral surface of the bobbin trunk 32 together with a portion of the bobbin trunk 32. The chamfered part 438b can be machined using a spherical cutting tool G rotated about a center D. Thus, the chamfered part 438b is another example of a noise reducing means.

Even when the first through holes 438 are provided in each flange 434 that gradually reduces in thickness toward the outer periphery, each chamfered part 438b formed as described above is not provided on any other part of the circumferential edge of each hole part 438a, i.e., a part located away from the bobbin trunk 32. Therefore, a strength of each flange 434 can be maintained.

<Other Exemplary Embodiments>

One preferred embodiment and its modifications in the present disclosure have been explained above. However, the present disclosure is not limited to the above, and a variety of changes can be made without departing from the scope of the present disclosure. Especially, the embodiment and the plural modifications described in the present specification can be arbitrarily combined on an as-needed basis.

(a) In the aforementioned preferred embodiment, the first through holes 38 are circumferentially disposed at intervals. However, in the present disclosure, the positional arrangement of the first through holes 38 is not limited to this. For example, the first through holes can be disposed at intervals in the circumferential direction and the radial direction. In this construction, some of the first through holes, which are disposed in radially outermost positions and are aligned in the circumferential direction, are only required to open radially inward from a radial position located away from the outer peripheral surface of the bobbin trunk 32 at the third distance R3. The third distance R3 is less than or equal to the second distance R2. The second distance R2 is 60% of the first distance R1 from the outer peripheral surface of the bobbin trunk 32 to the outer peripheral surface of each flange 34.

(b) In the aforementioned preferred embodiment, the positional arrangement of the first through holes 38 is defined based on the opening positions. However, in the present disclosure, the basis for the positional arrangement of the first through holes 38 is not limited to this. The first through holes 38 can be disposed in arbitrary positions as long as the first through holes 38 are covered with the fishing line and are not exposed during a high speed rotation of the spool 16 in the initial phase of casting. For example, the first through holes 38 can be provided in each flange 34 and are circumferentially disposed at intervals such that the first through holes 38 are covered with the fishing line when the wound length of the fishing line is half the maximum wound length thereof. When the spool 16 has a normal shape, the first through holes 38 can be covered with this length of fishing line and are provided radially inward from the aforementioned radial position located away from the outer peripheral surface of the bobbin trunk 32 at a distance corresponding to approximately 60% of a difference in a length between the outer diameter of the bobbin trunk 32 and that of the flange 34.

(c) In the aforementioned preferred embodiment and first to third modifications, the chamfered part is provided on the entire circumferential edge of each first through hole. However, similarly to the fourth modification, the chamfered part can be provided on only a part of the circumferential edge of each first through hole, i.e., a part located closest to the outer peripheral surface of the bobbin trunk.

Figure 12:
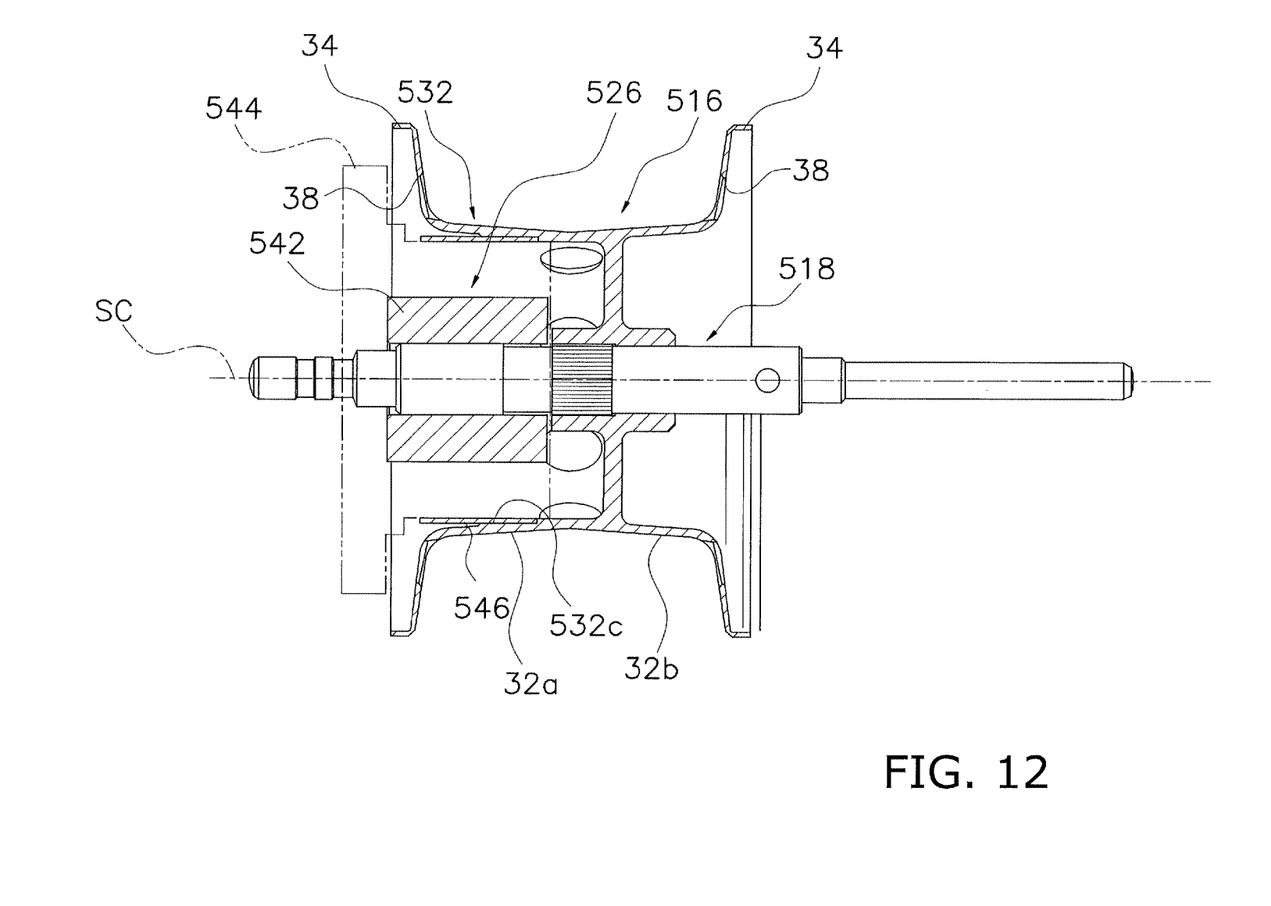
FIG. 12 is a cross-sectional view of a dual-bearing reel according to another preferred embodiment of the present disclosure and corresponds to FIG. 3.

(d) In the aforementioned preferred embodiment, the spool brake mechanism 26 brakes the spool 16 by a centrifugal force. However, as shown in FIG. 12, a spool brake mechanism 526 can be a dynamic brake mechanism including a magnet 542 and a coil 544. The magnet 542 is coupled to a spool shaft 518 and is unitarily rotatable therewith. The coil 544 generates an electricity by a rotation of the magnet 542. In this construction, a spool 516 can be provided with an annular recess 532c on the inner peripheral surface of a bobbin trunk 532. The annular recess 532c is a recess to which a tubular member 546 is mountable for preventing leakage of magnetic flux.

<Features>

The aforementioned preferred embodiment can be expressed as follows.

(A) The spool 16 for the dual-bearing reel 10 includes the bobbin trunk 32 having a tubular shape, the pair of flanges 34, each of which has a circular shape, and the plural first through holes 38. Each flange 34 of the pair of flanges 34 is provided on opposite ends of the bobbin trunk 32. Each flange 34 of the pair of flanges 34 has a larger diameter than the bobbin trunk 32. The plural first through holes 38 are provided in at least one flange 34 of the pair of flanges 34. The plural first through holes 38 are circumferentially disposed at intervals. The plural first through holes 38 open in the radial position located away from the outer peripheral surface of the bobbin trunk 32 at the third distance R3. The third distance R3 is less than or equal to the second distance R2 from the outer peripheral surface of the bobbin trunk 32. The second distance R2 is 60% of the first distance R1 from the outer peripheral surface of the bobbin trunk 32 to the outer peripheral surface of the at least one flange 34 of the pair of flanges 34.

In the spool 16 for the dual-bearing reel 10, the plural first through holes 38 are disposed to open in the radial position located away from the outer peripheral surface of the bobbin trunk 32 at the third distance R3. The third distance R3 is less than or equal to the second distance R2. The second distance R2 is 60% of the first distance R1 from the outer peripheral surface of the bobbin trunk 32 to the outer peripheral surface of the flange 34 relevant to the plural first through holes 38. With this construction, the first through holes 38 are covered with the fishing line and are not exposed to the outside in an initial phase of casting in which the speed of casting is the fastest. Therefore, air is prevented from passing through the first through holes 38, and an occurrence of a noise can be inhibited even when the spool 16 is rotated at a high speed during a casting.

(B) Each of the plural first through holes 38 can be a circular hole having the center C located closer to the outer peripheral surface of the bobbin trunk 32 than the radial position. According to this construction, the first through holes 38 can be easily formed by machining or molding.

(C) Each of the plural first through holes 138 can be a rectangular hole elongated in a radial direction from the axis of the spool shaft SC with rounded ends. According to this construction, each of the elongated rectangular holes with rounded ends can be reduced in a width along a rotational direction of the spool even when bored by the same amount as a circular hole. Therefore, the amount of air passing through the through holes can be reduced, and an occurrence of a noise (i.e., wind sound) can be further inhibited. Thus, the rounded ends of the first through holes 138 are another example of a noise reducing means.

(D) Each flange 34 of the pair of flanges 34 can be constructed to have a thickness gradually increasing from outside to inside in a radial direction. According to this construction, a part of each flange, located close to the bobbin trunk 32, has a gradually increasing thickness. Hence, even when the first through holes 38 are provided in close positions to the bobbin trunk 32, a degradation in a strength of the flange 34 relevant to the first through holes 38 can be inhibited.

(E) Each of the plural first through holes 38 can be provided with the chamfered part 38b on at least a part of the circumferential edge thereof. The at least a part of the circumferential edge is located close to the outer peripheral surface of the bobbin trunk 32. According to this construction, the flow rate of air becomes unlikely to vary due to the chamfered parts 38b, and an occurrence of a noise can be further inhibited. Thus, the chamfered parts 38b are another example of a noise reducing means.

(F) The spool 16 can further include the second through holes 40 penetrating through the outer peripheral surface and the inner peripheral surface of the bobbin trunk 32. In light of the specification, it would be understood that number of second through holes 40 can vary, and the shape of the second through holes 40 can vary from being elliptical, rectangular, and polygonal. According to this construction, it is possible to achieve a further reduction in a weight and in an inertia of the spool 16. Thus, the second through holes 40 are an example of a means for reducing a weight of the bobbin trunk.

(G) The spool 16 for the dual-bearing reel 10 includes the bobbin trunk 32 having a tubular shape, a pair of flanges 34, each of which has a circular shape, and the plural first through holes 38. Each flange 34 of the pair of flanges 34 is provided on opposite ends of the bobbin trunk 32. Each flange 34 of the pair of flanges 34 has a larger diameter than the bobbin trunk 32. The plural first through holes 38 are provided in at least one flange 34 of the pair of flanges 34. The plural first through holes 38 are circumferentially disposed at intervals such that the plural first through holes 38 are covered with the fishing line when the wound length of the fishing line is half the maximum wound length thereof.

In the spool 16 for the dual-bearing reel 10, the plural first through holes 38 are provided in at least one flange 34 of the pair of flanges 34. The plural first through holes 38 are circumferentially disposed at intervals such that the plural first through holes 38 are covered with the fishing line when the wound length of the fishing line is half the maximum wound length thereof. The length of the fishing line maximally released in a normal casting is approximately half the maximum wound length of the fishing line. Therefore, the first through holes 38 are not exposed during a casting. In other words, the first through holes 38 are covered with the fishing line and are not exposed to the outside during a casting. Therefore, an occurrence of a noise can be inhibited even when the spool 16 is rotated at a high speed during a casting.

What is claimed is:

1. A spool for a dual-bearing reel, the spool comprising:
a bobbin trunk having a tubular shape;
a pair of flanges, each flange provided on opposite ends of the bobbin trunk, each flange having a circular shape, each flange having a larger diameter than the bobbin trunk; and
a plurality of first through holes provided in at least one flange of the pair of flanges, the plurality of first through holes circumferentially disposed at intervals about the at least one flange of the pair of flanges, a circumferential edge of the plurality of first through holes opening in a radial position located at a distance away from an outer peripheral surface of the bobbin trunk, the distance being less than or equal to a second distance from the outer peripheral surface of the bobbin trunk, the second distance being 60% of a distance from the outer peripheral surface of the bobbin trunk to an outer peripheral surface of the at least one flange of the pair of flanges.

2. The spool according to claim 1, wherein each of the plurality of first through holes is a circular hole having a center located closer to the outer peripheral surface of the bobbin trunk than the radial position.

3. The spool according to claim 1, wherein each of the plurality of first through holes is a rectangular hole elongated in a radial direction from a rotational axis of the bobbin trunk, the rectangular hole having rounded ends.

4. The spool according to claim 1, wherein each flange of the pair of flanges has a thickness gradually increasing in a radial direction from an outside of the flange to an inside of the flange.

5. The spool according to claim 1, wherein each first through hole of the plurality of first through holes is provided with a chamfered part, the chamfered part being on at least a part of the circumferential edge of the first through hole, and the at least a part of the circumferential edge is a part of the circumferential edge closest to the outer peripheral surface of the bobbin trunk.

6. The spool according claim 1, further comprising:
a second through hole penetrating through the outer peripheral surface and an inner peripheral surface of the bobbin trunk.

7. The spool according to claim 1, wherein the plurality of first through holes are provided on both flanges of the pair of flanges.

8. The spool according to claim 1, wherein the spool includes more than 5 and fewer than 21 first through holes.

9. A spool for a dual-bearing reel, the spool comprising:
a bobbin trunk having a tubular shape;
a first flange disposed on a first distal end of the bobbin trunk, the first flange having a circular shape, an outermost radius of the first flange from a rotational axis of the spool being larger than an outermost radius of the first distal end of the bobbin trunk from the rotational axis of the spool;
a second flange disposed on a second distal end of the bobbin trunk, the second flange having a circular shape, an outermost radius of the second flange from the rotational axis of the spool being larger than an outermost radius of the second distal end of the bobbin trunk from the rotational axis of the spool; and
a plurality of first through holes disposed through the first flange, each of the plurality of first through holes being a rectangular hole elongated in a radial direction from the rotational axis of the spool, the rectangular hole having rounded ends, the plurality of first through holes circumferentially disposed at intervals about the first flange, each of the plurality of first through holes having a center closer to the outermost radius of the first distal end of the bobbin trunk than to the outermost radius of the first flange.

10. The spool according to claim 9, wherein the bobbin includes a first taper surface and a second taper surface, the first taper surface tilting from the first distal end of the bobbin trunk to a center position of the bobbin trunk, the second taper surface tilting from the second distal end of the bobbin trunk to the center position of the bobbin trunk, the center position disposed a minimal radial distance from the rotational axis of the spool; and
each of the plurality of first through holes includes a remote portion, the remote portion being a portion of a circumferential edge of the through hole farthest from the rotational axis of the spool, the remote portion closer to the rotational axis of the spool than to the minimal radial distance plus 60% of a distance between the minimal radial distance and the outermost radius of the first flange.

11. The spool according to claim 9, wherein both flanges of the pair of flanges have a gradually increasing thickness in a radial direction from the rotational axis of the spool.

12. The spool according to claim 9, wherein each first through hole of the plurality of first through holes is provided with a chamfered part, the chamfered part being on at least a part of a circumferential edge of the first through hole closest to an outer peripheral surface of the bobbin trunk.

13. The spool according to claim 9, further comprising:
a second through hole penetrating through an outer peripheral surface of the bobbin trunk and an inner peripheral surface of the bobbin trunk.

14. The spool according to claim 9, wherein the plurality of first through holes are on both flanges of the pair of flanges.

* * * * *